April 7, 1959 P. D. LACY 2,881,393

MODULATION METHOD AND SYSTEM

Filed Nov. 2, 1955 2 Sheets-Sheet 1

INVENTOR.
PETER D. LACY
BY Flehr & Swain
ATTORNEYS

MODULATION METHOD AND SYSTEM

Filed Nov. 2, 1955 2 Sheets-Sheet 2

INVENTOR.
PETER D. LACY
BY Flehr & Swain
ATTORNEYS

United States Patent Office 2,881,393

Patented Apr. 7, 1959

2,881,393

MODULATION METHOD AND SYSTEM

Peter D. Lacy, Redwood City, Calif., assignor to Hewlett-Packard Company, Palo Alto, Calif., a corporation of California Application November 2, 1955, Serial No. 544,560

17 Claims. (Cl. 332—16)

This invention relates generally to a modulation method and system and more particularly to a modulation method and system in which arbitrary frequency and phase modulation is achieved by approximating unlimited phase deviation.

A common method of obtaining a frequency modulated wave is to control the frequency of an oscillator by the modulating voltage. Generally, this is achieved by placing a reactance tube across the tuned circuit of the oscillator. In order to obtain a linear relationship between the frequency change and the modulating voltage, it is necessary to limit the frequency deviations to a relatively small value. If the deviation is less than desired, harmonic generators are used to multiply the carrier frequency and the frequency deviation. Generally, modulation systems of this type are operated at low power levels and amplifiers are employed in conjunction with the harmonic generators to increase the output power.

As is well known, a frequency modulated wave may be obtained from a phase modulator by making the modulating voltage applied to the modulator inversely proportional to the modulating frequency. As a result, phase modulating systems are often employed to obtain frequency modulated waves having higher average frequency stability than is obtainable with frequency modulators.

The amount of phase deviation obtainable in present phase modulators employing conventional vacuum tubes and circuits are of the order of 90°. Conceivably, deviations as high as 360° may be obtained with several stages cascaded and modulated simultaneously. In transistors, variations in electrode potentials may introduce as much as 360° phase shift. This is achieved by varying the velocity of the current carriers. Variation of the helix voltage of a travelling wave tube, the wall voltage of a resistive wall amplifier, or the beam voltage in a klystron may serve to introduce a 360° phase shift.

In the design and test of continuous wave, coherent pulse and frequency modulated doppler radar systems, it is necessary to have both a transmitted and received spectra. In order to simulate the reflected spectra it is necessary to have large frequency or phase deviations. With prior art equipment deviations of this order are not obtainable. Thus to test the radar system it becomes necessary to undertake expensive field test.

It is a general object of the present invention to provide an improved modulating method and system.

It is a further object of the present invention to provide a modulation method and system for obtaining unlimited phase deviation.

It is still another object of the present invention to provide a modulation method and system in which arbitrary frequency or phase modulation is obtained by approximating unlimited phase deviation.

It is a further object of the present invention to provide a modulation method and system in which arbitrary phase modulation is obtained by approximating unlimited phase deviation, and which may be used with conventional apparatus capable of introducing 360° phase shift.

It is still a further object of the present invention to provide a modulation method and system in which a phase modulator serves to modulate a carrier frequency in accordance with a modulated sawtooth voltage having limited amplitude variations and instantaneous slopes or amplitudes corresponding to the modulation signal to give a frequency or phase modulated carrier.

These and other objects of the invention will appear more clearly from the following description when taken in conjunction with the accompanying drawings.

Referring to the drawings.

Figures 1, 2:
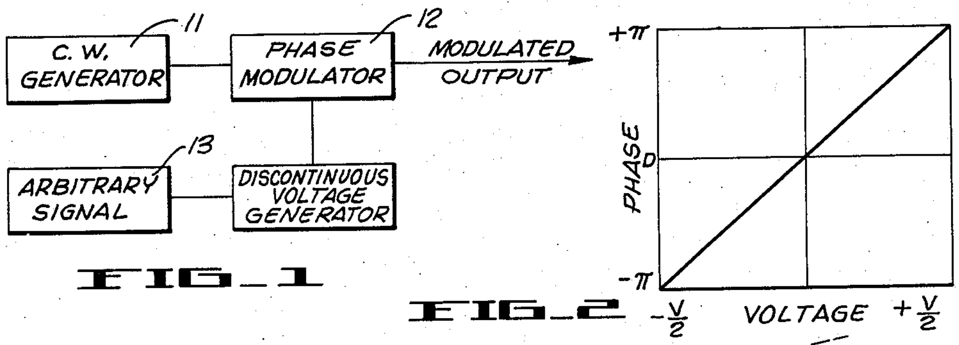
Figure 1 is a block diagram of a modulation system which incorporates my invention.
Figure 2 is a curve of phase shift as a function of voltage for the modulator of Figure 1.

Referring to Figure 1, a block diagram of a modulating system is shown. A continuous wave generator 11 serves to generate the carrier frequency wave which is applied to the phase modulator 12. The arbitrary input signal 13 is applied to the sawtooth voltage generator 14. The generator 14 produces a modulated sawtooth voltage which is modulated to have instantaneous slopes or amplitudes corresponding to the arbitrary signal. To frequency modulate the carrier the sawtooth voltage has instantaneous slopes which correspond to the arbitrary signal. To phase modulate the carrier, instantaneous amplitudes correspond to the arbitrary signal.

The phase modulator 12 modulates the carrier frequency in accordance with the modulated sawtooth voltage applied thereto. Continuous phase modulation is approximated by discontinuous changes. The output is modulated in accordance with the arbitrary input signal. Depending upon the character of the generator 14 either a frequency or phase modulated output may be obtained.

The phase modulator 12 may be any suitable phase modulator capable of introducing a 360° phase shift. Modulation of this order may be obtained by cascading conventional vacuum tube modulators, or by suitably varying the transit time in travelling wave tubes, resistive wall amplifiers, klystrons and transistors. In Figure 2 a suitable curve of phase as a function of voltage is shown. This curve shows a suitable response for the phase modulator 12. Thus, as the voltage varies between $$-\frac{V}{2} \text{ and } +\frac{V}{2}$$

the phase changes from $-\pi$ radians to $+\pi$ radians. A voltage variation equal to V changes the phase of the carrier frequency voltage by $2\pi$ radians.

Figure 3:
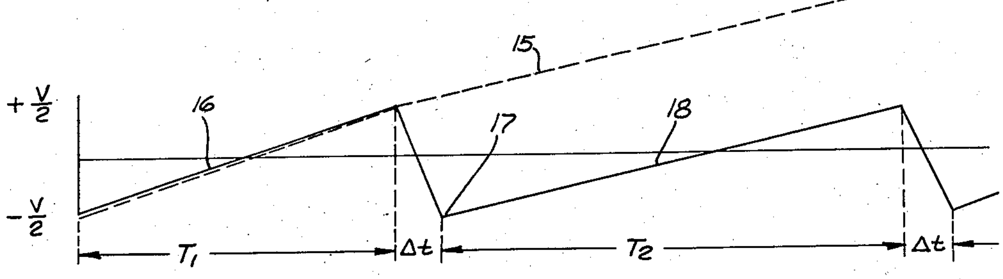
Figure 3 is a curve showing a sawtooth, slope preserving, equivalent of an increasing voltage.

Referring to Figure 3, the modulated sawtooth voltage, which is the equivalent of the increasing voltage 15 developed by the generator 14 is shown. The voltage increases in steps from $$-\frac{V}{2} \text{ to } +\frac{V}{2}$$

For example, it increases along curve 16 and then flies back to point 17 where it again increases along the curve 18 to a maximum of $$\frac{V}{2}$$

where it again flies back. In the time $T_1$ the carrier voltage has been advanced 360° in phase. The apparent frequency shift for the portion 16 is $$\frac{1}{T_1}$$

In the second portion 18 the time $T_2$ is required for advancing the phase 360°. In this instance the apparent frequency shift equals $$\frac{1}{T_2}$$

This is a step-wise approximation to a continuous phase advance from 0 to 720°. By adding more steps, unlimited phase deviation may be approximated. One cycle of R.-F. has been added during the period $T_1$ and another cycle during the period $T_2$. As shown, the curves 16 and 18 have a constant variation throughout their period. It is of course to be understood that these voltages may have any variation and the instantaneous phase and frequency shifts will then be proportional to the instantaneous amplitude of the sawtooth voltage.

The limitation upon the maximum apparent frequency shift which may be introduced by discontinuous stepwise approximations depends upon the fly-back time $\Delta T$. Thus when the period of the sawtooth voltage is approximately equal to the fly-back time, the information lost becomes substantial. The fly-back time in generators of this type may be reduced to 1/10 microsecond or less. The frequency shift where the rise time is equal to the fly-back time is reached at 10 microseconds or more. Thus the system described is capable of frequency modulation between 0 and 10 megacycles or more.

Figure 4:
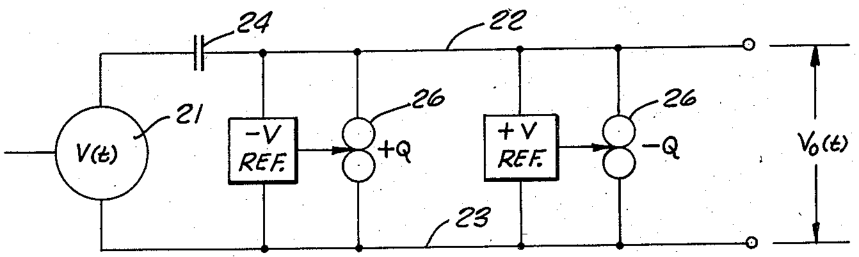
Figure 4 is a schematic diagram of a circuit suitable for generating a modulated sawtooth voltage for application to the phase modulator to obtain an output signal having phase modulation corresponding to an arbitrary input signal.
Figure 5:
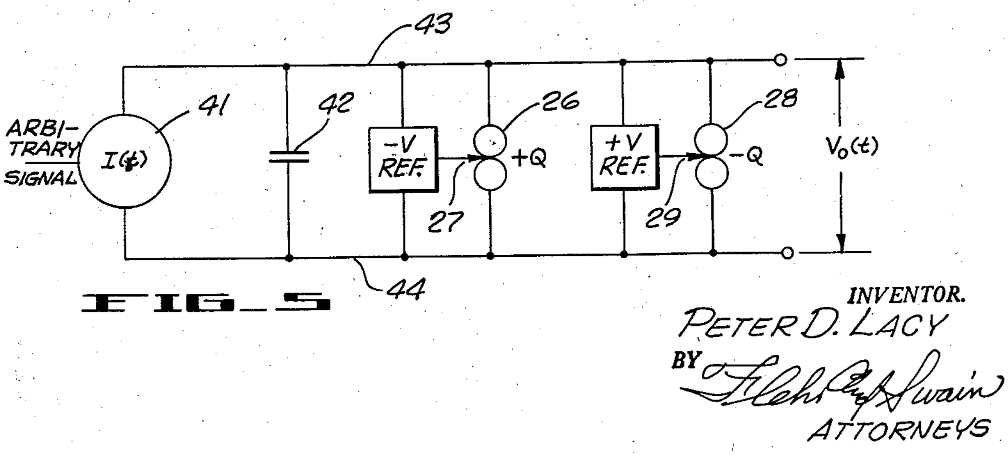
Figure 5 is a schematic circuit for generating a modulated sawtooth voltage for application to the phase modulator to obtain an output signal having frequency modulation corresponding to the arbitrary input signal.

Suitable circuits for obtaining sawtooth voltages modulated to have instantaneous amplitudes or slopes corresponding to an arbitrary signal are shown in Figures 4 and 5 respectively. Referring to Figure 4, a constant voltage (zero impedance) generator 21 is shown connected in series with capacitor 24 across the lines 22 and 23. This generator may, for example, comprise a cathode follower circuit. A capacitor 24 is connected in the line 22 in series with the generator 21. An impulse circuit 26 generates an impulse having a charge Q, sufficient to recharge the capacitor 24, whenever the voltage between the lines 22 and 23 reaches a predetermined negative value. Similarly, an impulse circuit 28 serves to generate an impulse having a charge —Q, sufficient to fully discharge the capacitor 24 when the voltage across the lines 22 and 23 reaches a predetermined positive value. The impulse generators may, for example, comprise a blocking oscillator which will go into oscillation when the voltage between the lines 22 and 23 reaches a predetermined value.

The arbitrary signal 33 serves to control the voltage generated by the generator 21 whereby the charge on the condenser 24 varies in accordance with the arbitrary signal. The voltage $V_0(t)$ appearing at the output of the generator has instantaneous amplitudes which are proportional to the arbitrary signal.

As previously described, in order to obtain frequency modulation from a phase modulator, it is necessary that the input signal be inversely proportional to the modulating frequency. The circuit of Figure 5 is suitable for producing a frequency modulated output wave from a phase modulator of the type described. This circuit comprises a constant current (infinite impedance) generator 41 which has the arbitrary signal applied thereto. This generator may, for example, comprise a pentode circuit. Application of the arbitrary signal serves to vary the current supplied by the generator in accordance with the signal voltage. A condenser 42 is connected across the lines 43 and 44. Means 26 and 28 for generating impulses having the requisite charges +Q and —Q respectively are connected across the lines 43 and 44. These means are similar to those previously described and therefore carry similar reference characters. The output voltage $V_0(t)$ has instantaneous slopes which are inversely proportional to the arbitrary signal. This voltage is applied to the phase modulator which frequency modulates the carrier in accordance with the arbitrary input signal.

Figure 6:
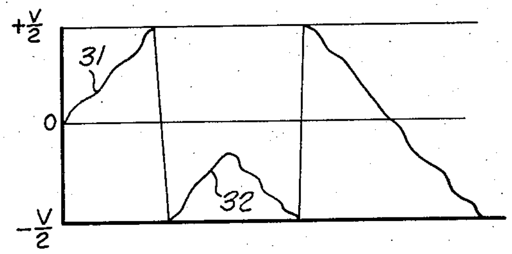
Figure 6 shows a typical modulated sawtooth voltage obtained with the circuits of Figures 4 and 5.

Referring to Figure 6, the voltage 31 which has its amplitude or slope modulated in accordance with the input signal, rises to a value of $$+\frac{V}{2}$$

at which instance the generator 28 supplies a charge —Q to drive the voltage to the value $$-\frac{V}{2}$$

the voltage then rises along the curve 32. For purposes of illustration, the voltages show increase to a maximum and then decrease to the value $$-\frac{V}{2}$$

when the voltage reaches the value $$-\frac{V}{2}$$

the impulse generator 26 is triggered and a charge +Q is applied to thereby instantaneously increase the voltage to a value of $$+\frac{V}{2}$$

where the voltage is then allowed to continue decreasing. Thus it is seen that means are provided for forming modulated sawtooth voltages which have instantaneous amplitudes or slopes which are the same as would exist for a continuous modulating voltage.

Figure 7:
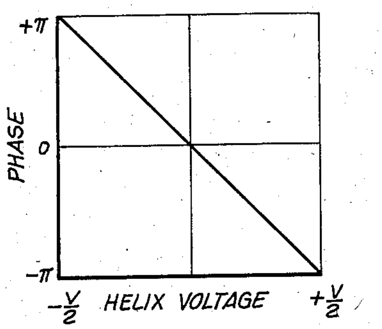
Figure 7 is a plot of phase shift as a function of helix voltage for a travelling wave tube amplifier.

In Figure 7 I have shown phase as a function of helix voltage for a travelling wave tube. It is noted that as the voltage is varied between the limit $$-\frac{V}{2} \text{ and } +\frac{V}{2}$$

the phase undergoes a 360° phase shift. As before, this phase shift corresponds to one cycle of frequency change. By employing a circuit of the type shown in Figures 4 and 5 for generating a sawtooth wave having instantaneous amplitudes or slopes corresponding to the arbitrary signal, as the case may be for phase or frequency modulation, and applying the voltage to the travelling wave tube helix to vary the helix voltage in accordance therewith, the carrier frequency is modulated in accordance with the arbitrary input signal Figure 7. The carrier wave is amplified as well as modulated. Thus both amplification and modulation are afforded by the travelling wave tube.

Figures 8, 9, 10, 11, 12:
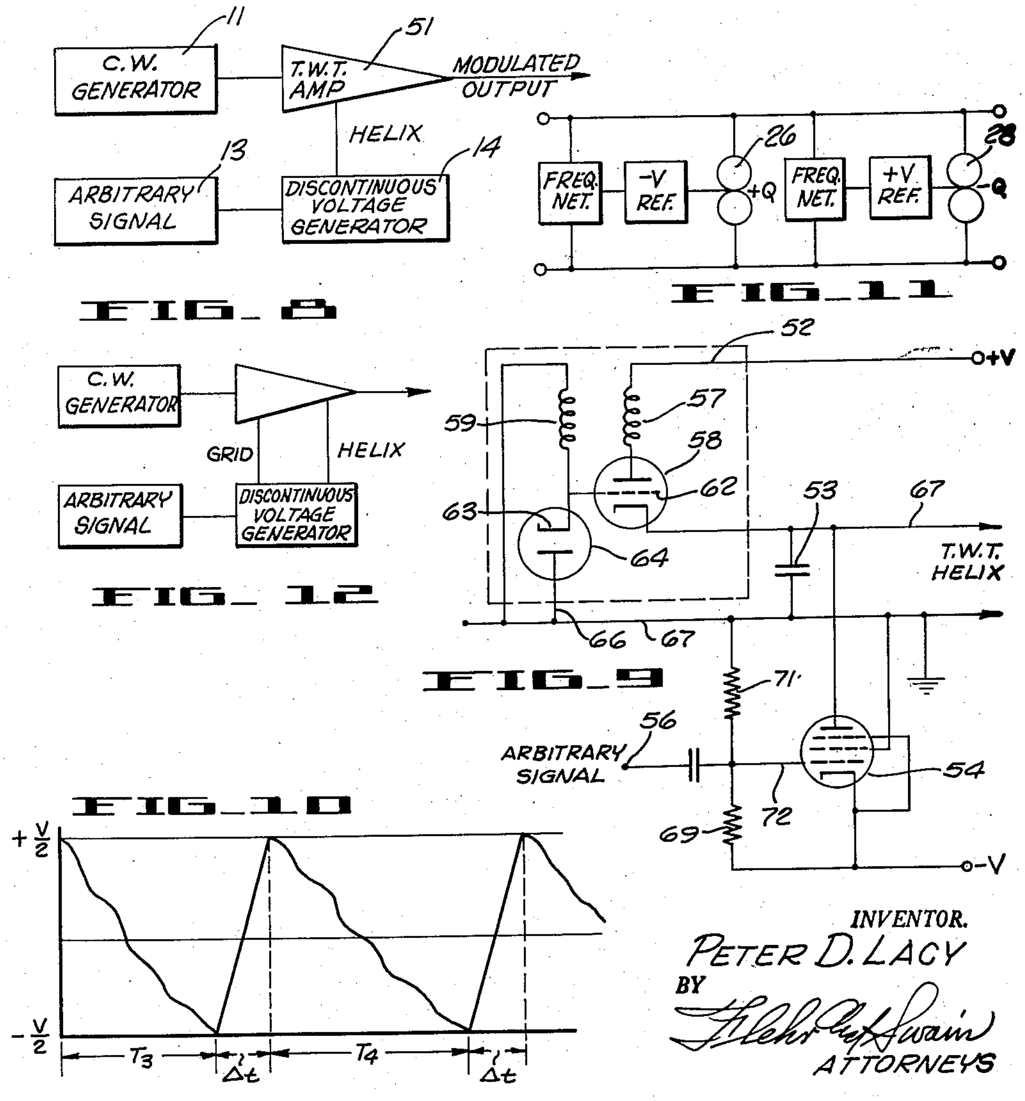
Figure 8 is a block diagram of a modulating system incorporating a travelling wave tube amplifier.
Figure 9 shows a circuit for forming the modulated sawtooth voltage applied to the travelling wave tube helix to form an output which is frequency modulated in accordance with an arbitrary input signal.
Figure 10 shows a typical modulated sawtooth voltage formed by the circuit of Figure 9.
Figure 11 shows impulse generators in which the formation of impulses is dependent upon the modulating frequency.
Figure 12 is a block diagram of a modulating system which includes means for blanking during flyback.

Referring particularly to Figure 8, a continuous wave generator 11 supplies the input carrier frequency to the helix of the travelling wave tube amplifier 51 in a well known manner, see for example: Pierce, Travelling Wave Tubes, D. Van Nostrand Co. Inc., 1950. The arbitrary signal 13 is applied to a modulated sawtooth voltage generator 14 of one of the two types previously described. The generator 14 serves to form a modulated sawtooth voltage having instantaneous amplitudes or slopes corresponding to the arbitrary input signal. This voltage is employed to modulate the beam velocity in accordance therewith. The coupling between the helix wave and the beam serves to modulate the carrier frequency phase in accordance with the modulation of the beam velocity, Figure 7. The output of the travelling wave tube is a phase or frequency modulated carrier depending upon the type of sawtooth generator chosen.

Referring particularly to Figure 9, a generator 14 of the type suitable for forming a modulated sawtooth voltage having instantaneous slopes which correspond to the input signal is shown. The blocking oscillator 52 serves as reference level and impulse generator to apply impulses to the capacitor 53. The pentode 54 acts as an infinite impedance source which serves to discharge the condenser 53 in accordance with the arbitrary signal fed along the lines 56. The circuit illustrated accommodates negative slopes only. It is the same as the circuit of Figure 5 with 28 and 29 omitted.

The blocking oscillator comprises a coil 57 which has one end connected to the plate of the triode 58 and its other end connected to a source of positive voltage. A second coil 59 is coupled to the coil 57 and has one end connected to the lead 61. The other side of the coil 59 is connected to the grid 62 of triode 58. The cathode 63 of the diode 64 is also connected to the grid. The plate 66 of the diode 64 is connected to the line 61. The blocking oscillator starts itself when the voltage across lines 61 and 67 reaches a predetermined value, and the condenser 53 is then recharged. The diode 64 damps negative swing back of the blocking oscillator grid.

The pentode has its plate connected to the line 67. The control grid is connected to the line 61. The suppressor grid is connected to the cathode, and the cathode is connected to a source of negative voltage. Resistors 69 and 71 are connected between the line 61 and the negative voltage source. The arbitrary signal is applied along the line 56 to the screen grid 72. The arbitrary signal serves to vary the current through the pentode above and below an average value. Thus the discharge of the condenser 53 is controlled and the slope of its discharge curve will vary in accordance with the arbitrary signal. The output signal appears between the lines 61 to 67. The output sawtooth voltage is applied between the cathode and helix of the travelling wave tube to thereby phase modulate the output in accordance therewith.

Referring to Figure 10, a typical sawtooth voltage is shown. 360° of phase deviation and one cycle of frequency shift is obtained during each of the periods T3 and T4. The instantaneous frequency or phase shifts vary about the average. Instantaneous frequency or phase shifts may be considerably greater than the average for a particular sawtooth voltage.

Referring particularly to Figures 3, 6 and 10, it is noted that the impulse generators generate an impulse when the modulated sawtooth voltages reach the value $$-\frac{V}{2} \text{ or } +\frac{V}{2}$$

Referring particularly to Figure 3, it is noted that if the beginning of the voltage 18 is transposed to the level $$+\frac{V}{2}$$

that the voltage will have a slope which is identical to the original curve 15 but will be displaced timewise by a slight amount. The displacement is due to the fly-back time. A slight discontinuity is introduced. The errors introduced by this discontinuity are greater for greater modulating frequencies, i.e., for continuous voltages which increase at a more rapid rate. By providing a suitable circuit which triggers the impulse generators before the sawtooth voltage reaches the value $$+\frac{V}{2} \text{ or } -\frac{V}{2}$$

the curves may be formed such that they will lie on the original curve when transposed as mentioned above. By employing a frequency sensitive network, the impulse generator may be made to trigger a time ΔT before the sawtooth voltages reach $$-\frac{V}{2} \text{ or } +\frac{V}{2}$$

Such a network should emphasize the higher frequencies and might, for example, comprise a resistive-capacitive network. A suitable circuit for incorporation in the apparatus of Figures 3 or 4 is shown in Figure 11.

It is also desirable in certain instances to blank out the transmitted signals during flying back since extraneous signals are generated during flyback. When employing a travelling wave tube, Figure 12, a pulse may be applied to the grid to thereby blank out the signal during flyback. This pulse may be generated simultaneously with the generation of the charges +Q and −Q.

Thus it is seen that I have provided a modulation method and system capable of giving arbitrary frequency and phase modulation by approximating unlimited phase deviation. It is not necessary to employ harmonic generators to obtain the desired high apparent phase deviation because the desired phase deviation may be obtained directly. When employing travelling wave tube amplifiers, resistive wall amplifiers and klystron amplifiers, the desired output level can be obtained directly, thus eliminating the need for amplifiers.

I claim:

1. A modulation system comprising a continuous wave generator serving to generate a carrier frequency, a sawtooth voltage generator serving to generate a sawtooth voltage instantaneously modulated in accordance with an arbitrary input signal, and a modulator serving to phase modulate the carrier in accordance with the sawtooth voltage to thereby produce a modulated output.

2. Apparatus as in claim 1 wherein the instantaneous slope of the sawtooth voltage is modulated in accordance with the arbitrary signal to thereby produce a frequency modulated output.

3. Apparatus as in claim 1 wherein said instantaneous amplitude of the sawtooth voltage is modulated in accordance with the arbitrary signal to thereby produce a phase modulated output.

4. Apparatus as in claim 1 wherein said modulator comprises a travelling wave tube amplifier including a helix and an electron stream disposed to interact with a wave travelling thereon, said carrier frequency signal applied to the helix and amplified by the interaction, said sawtooth voltage being applied to the tube in such a manner as to modulate the beam transit time whereby the amplified signal is phase modulated in accordance with the modulated sawtooth voltage.

5. A modulation system comprising a continuous wave generator serving to generate a carrier frequency, a sawtooth voltage generator serving to generate a sawtooth voltage varying between upper and lower limits and instantaneously modulated in accordance with the arbitrary signal, and a phase modulator serving to modulate the carrier in accordance with the sawtooth voltage, said phase modulator serving to introduce $2\pi$ radians of phase shift to the carrier for voltage excursions between the upper and lower limits whereby unlimited phase deviation of the carrier is approximated by its discontinuous equivalents.

6. Apparatus as in claim 5 wherein the slope of the sawtooth voltage is modulated in accordance with the arbitrary signal to thereby produce a frequency modulated output.

7. Apparatus as in claim 5 wherein the amplitude of the sawtooth voltage is modulated in accordance with the arbitrary signal to thereby produce a phase modulated output.

8. Apparatus as in claim 5 wherein said sawtooth voltage generator comprises a constant current generator, a capacitor connected in series with said current generator, means connected in parallel with said generator and capacitor for charging said capacitor when the voltage decreases to a predetermined value, and means connected in parallel with said generator and capacitor for discharging said capacitor when the voltage increases to a predetermined value, the voltage of said constant current generator being controlled by the arbitrary input signal, whereby the sawtooth voltage has instantaneous slopes corresponding to the arbitrary signal.

9. Apparatus as in claim 8 in which said charging and discharging is governed by the rate of change of the sawtooth voltage.

10. Apparatus as in claim 5 wherein said sawtooth voltage generator comprises a constant voltage generator, a capacitor connected in parallel with said generator, means for charging said capacitor when the voltage thereon decreases to a predetermined value, and means for discharging said capacitor when the voltage increases to a predetermined value, said arbitrary signal serving to control the current through said generator whereby a sawtooth voltage is formed having instantaneous amplitudes which vary in accordance with the arbitrary signal.

11. Apparatus as in claim 10 in which said charging and discharging is governed by the rate of change of the sawtooth voltage.

12. Apparatus as in claim 5 wherein said phase modulator comprises a travelling wave tube which amplifies and phase modulates the carrier, said carrier being applied to the helix, and said sawtooth voltage being applied in such a manner as to vary the beam transit time.

13. Apparatus as in claim 12 wherein said sawtooth voltage generator comprises a blocking oscillator, a capacitor connected to said blocking oscillator and charged thereby, a pentode connected across said capacitor and serving to discharge said capacitor in accordance with the arbitrary signal, the voltage appearing across said capacitor being applied to the travelling wave tube helix to modulate the beam velocity in accordance therewith.

14. A modulation system comprising a continuous wave generator serving to generate a carrier frequency, a sawtooth voltage generator serving to generate a discontinuous voltage instantaneously modulated in accordance with an arbitrary signal, a travelling wave tube amplifier including an electron stream, a helix and a control grid for controlling the stream, the carrier frequency being applied to the helix and amplified, said discontinuous voltage being applied in such a manner as to modulate the beam transit time whereby the carrier is phase modulated in accordance with the input signal.

15. Apparatus as in claim 14 wherein said sawtooth voltage generator comprises a constant current generator, a capacitor connected in series with said generator, means connected in parallel with said generator and capacitor for charging said capacitor when the voltage decreases to a predetermined value, means connected in parallel with said generator and capacitor for discharging said capacitor when the voltage increases to a predetermined value, the voltage of said constant current generator being controlled by the arbitrary input signal, whereby the sawtooth voltage has instantaneous slopes corresponding to the arbitrary signal, and means serving to apply a negative pulse to the grid of said travelling wave tube when said capacitor is being charged and discharged.

16. Apparatus as in claim 14 wherein said sawtooth voltage generator comprises a constant voltage generator, a capacitor connected in parallel with said generator, means for charging said capacitor when the voltage thereon decreases to a predetermined value, means for discharging said capacitor when the voltage increases to a predetermined value, said arbitrary signal serving to control the current through said generator whereby a sawtooth output voltage is formed having instantaneous amplitudes which correspond to the arbitrary input signal, and means serving to apply a negative pulse to the grid of said travelling wave tube when the capacitor is being charged and discharged.

17. A modulation system comprising a continuous wave generator serving to generate a carrier frequency, a sawtooth voltage generator serving to generate a sawtooth voltage varying between upper and lower fixed limits and instantaneously modulated in accordance with a modulation signal applied thereto, a traveling wave tube comprising a helix and an electron stream disposed to interact with the wave travelling thereon, said carrier frequency signal being applied to the helix and amplified by interaction with the stream, said sawtooth voltage being applied to the tube in such a manner as to modulate the beam transit time whereby the amplifier signal is phase modulated in accordance with the modulated sawtooth voltage, said upper and lower fixed limits being fixed at a value which introduces $2\pi$ radians phase shift in the carrier for voltage excursions between the same.

References Cited in the file of this patent

UNITED STATES PATENTS

| | | |
|---|---|---|
| 2,507,170 | Mesner | May 9, 1950 |
| 2,564,687 | Guenther | Aug. 21, 1951 |
| 2,575,993 | Bennett et al. | Nov. 20, 1951 |
| 2,619,543 | Cutler | Nov. 25, 1952 |
| 2,719,954 | Palluel et al. | Oct. 4, 1955 |